(12) United States Patent
Ling et al.

(10) Patent No.: US 6,363,102 B1
(45) Date of Patent: Mar. 26, 2002

(54) METHOD AND APPARATUS FOR FREQUENCY OFFSET CORRECTION

(75) Inventors: Fuyun Ling, San Diego; Peter J. Black, La Jolla; Kenneth D. Easton, San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/298,252

(22) Filed: Apr. 23, 1999

(51) Int. Cl.[7] .................................................. H03B 1/69
(52) U.S. Cl. ........................ 375/147; 375/150; 375/152
(58) Field of Search .................................. 375/140, 142, 375/143, 147, 148, 150, 152; 370/203, 206, 335, 342

(56) References Cited

U.S. PATENT DOCUMENTS

| | | | |
|---|---|---|---|
| 3,332,035 A | | 7/1967 | Kovalevski |
| 3,421,111 A | | 1/1969 | Boyajian |
| 3,889,210 A | | 6/1975 | Matsura et al. ............. 331/109 |
| 4,609,884 A | | 9/1986 | Kindinger et al. .......... 331/109 |
| 5,081,429 A | | 1/1992 | Atriss et al. .................. 331/57 |
| 5,097,228 A | | 3/1992 | McJunkin .................... 331/176 |
| 5,373,264 A | | 12/1994 | Higgins, Jr. ................. 331/117 |
| 5,386,239 A | * | 1/1995 | Wang et al. ................. 348/472 |
| 5,594,757 A | * | 1/1997 | Rohani ........................ 375/344 |
| 5,602,881 A | * | 2/1997 | Shiino et al. ................ 375/371 |
| 5,619,524 A | * | 4/1997 | Ling et al. ................... 375/130 |
| 5,659,573 A | * | 8/1997 | Bruckert et al. ............. 375/142 |
| 5,684,836 A | * | 11/1997 | Nagayasu et al. .......... 375/326 |
| 5,691,974 A | * | 11/1997 | Zehavi et al. ............... 370/203 |
| 5,751,776 A | * | 5/1998 | Shiino et al. ................ 375/371 |

OTHER PUBLICATIONS

"Design of Quadricorrelators for Automatic Frequency Control Systems", D'Andrea et al., IEEE Trans. On Comm., Vol 41, No. 6 Jun. 1996, p. 988–997.
"AFC Tracking Algorithms", Natali, IEEE Trans. on Comm., vol. Com 32, No. 8 Aug. 1984, pp. 935–947.
"Convergence and Output MSE of Digital Frewquency Locked Loop For Wireless Communication", Ling, (Paper).

* cited by examiner

*Primary Examiner*—Young T. Tse
(74) *Attorney, Agent, or Firm*—Philip R. Wadsworth; Kent D. Baker; Bruce W. Greenhaus

(57) ABSTRACT

Coherent detection of high-speed digital wireless communications becomes more difficult when the frequencies of the transmitter and receiver oscillators do not coincide. A frequency-locked loop may be used to characterize this frequency offset by processing the samples received on a pilot channel. Rather than using the offset information thus derived to correct the frequency of the received signal, the invention realizes a considerable computational savings by applying a frequency correction to the despread pilot samples instead.

11 Claims, 12 Drawing Sheets

METHOD AND APPARATUS FOR FREQUENCY OFFSET CORRECTION

BACKGROUND OF THE INVENTION

1. Field of the Invention

This invention relates to wireless communications. More specifically, this invention relates to systems for digital wireless communications that employ coherent detection.

2. Description of Related Art and General Background

1) Spread Spectrum and Code-division Multiple-access

Spread spectrum communication techniques are robust to noise, allow for the use of low transmission power, and have a low probability of intercept. For such reasons, much of the early development of spread spectrum technology was performed by military researchers. Recently, however, the advantages of this technology have led to its increasing use for consumer applications as well: most notably, in advanced digital cellular telephone systems.

Whereas most other communication techniques modulate a carrier signal with one or more data signals alone, spread spectrum techniques also modulate the carrier with a pseudorandom noise or 'pseudonoise' (PN) signal. In the frequency-hopping variant of spread spectrum systems, the value of the PN signal at a particular instant determines the frequency of the transmitted signal, and thus the spectrum of the signal is spread. In the direct sequence spread spectrum (DSSS) variant, the bit rate of the PN signal (called the 'chip rate') is chosen to be higher than the bit rate of the information signal, such that when the carrier is modulated by both signals, its spectrum is spread.

Communication systems that support multiple individual signals over a single channel must employ some technique to make the various signals distinguishable at the receiver. In time-division multiple-access (TDMA) systems, the individual signals are transmitted in nonoverlapping intervals such that they are orthogonal (and thus separable) in time space. In frequency-division multiple-access (FDMA) systems, the signals are bandlimited and transmitted in nonoverlapping subchannels such that they are orthogonal in frequency space. In code-division multiple-access (CDMA) systems, the signals are spread through modulation by orthogonal or uncorrelated code sequences such that they are orthogonal or nearly orthogonal in code space and may be transmitted across the same channel at the same time while remaining distinguishable from one another at the receiver. An exemplary CDMA system is described in U.S. Pat. No. 4,901,307, entitled "SPREAD SPECTRUM MULTIPLE-ACCESS COMMUNICATION SYSTEM USING SATELLITE OR TERRESTRIAL REPEATERS," issued Feb. 13, 1990 and assigned to the assignee of the present invention, and the disclosure of which is hereby incorporated by reference.

In a CDMA DSSS system, then, each individual carrier signal is modulated by a data signal and a pseudonoise (PN) signal that is at least nearly orthogonal to the PN signals assigned to all other users, thus spreading the spectrum of the transmitted signal while rendering it distinguishable from the other users' signals. Before spreading and modulation onto the carrier, the data signal typically undergoes various encoding and interleaving operations designed, for example, to increase data redundancy and allow error correction at the receiver. The data signals may also be encrypted to provide extra security against eavesdroppers. The generation of CDMA signals in a spread spectrum communications system is disclosed in U.S. Pat. No. 5,103, 459, entitled "SYSTEM AND METHOD FOR GENERATING SIGNAL WAVEFORMS IN A CDMA CELLULAR TELEPHONE SYSTEM," issued Apr. 7, 1992 and assigned to the assignee of the present invention, and the disclosure of which is hereby incorporated by reference.

2) Phase Modulation

In a DSSS telecommunications system, the baseband information signal is typically spread by the PN sequences to have a bandwidth of 1 MHz or more. In order to transmit the spread baseband signal over a radio channel, it is necessary to modulate it onto an RF carrier of the desired frequency.

Various methods of modulating digital baseband signals onto RF carriers exist. These methods typically operate by varying the amplitude, phase, and/or frequency of one or both of the in-phase (I) and quadrature (Q) components of the carrier according to the data symbol to be transmitted at any particular instant. DSSS systems commonly use a variant of either phase-shift keying (PSK), in which the phase states in the carrier components correspond to data symbols being transferred, or quadrature amplitude modulation (QAM), in which both the phases and the amplitudes of the carrier components are modulated.

In an exemplary system using binary PSK (BPSK) modulation, a transition of the carrier from a base phase state (defining a phase of zero) to a second phase state which is different by 180 degrees (i.e. a phase shift of $\pi$ radians away from zero) may be designated to indicate a transition from a data symbol 0 to a data symbol 1. The converse phase shift of $\pi$ radians back to zero would then be designated to indicate a transition from a data symbol 1 to a data symbol 0. Between these transitions, the phase of the carrier indicates whether a data symbol 0 is being transmitted (phase of zero) or a data symbol 1 instead (phase of $\pi$ radians). An improved ratio of data rate to bandwidth may be obtained by using quadrature PSK (QPSK) modulation, in which the data symbols are encoded into 180-degree shifts in both the I and Q components. These and other variants of PSK modulation are well known in the art.

Note that in PSK modulation, all phase states have significance only in relation to the base phase state. If this reference state is unknown, then only the points of phase state transition may be identified, and the actual identities of the symbols cannot be determined. In the BPSK system described above, for example, a phase shift of $\pi$ radians indicates either a transition from 0 to 1 or from 1 to 0. Unless one knows the relation between the base phase state and either the starting or the ending phase state, it is impossible to determine which transition was meant.

This phase ambiguity problem may be addressed in several different ways. One approach has been to avoid it by using a modulation which is suitable for noncoherent detection and does not require knowledge of the base phase state, such as differential PSK (DPSK). A more power-efficient method uses orthogonal signalling sets to encode the data symbols in a manner which is unambiguous regardless of the base phase state. The Hadamard-Walsh functions are one suitable signalling set, as discussed in Chapter 4 of *CDMA: Principles of Spread Spectrum Communications* by Andrew J. Viterbi, Addison Wesley Longman, Reading, Mass., 1995, which chapter is herein incorporated by reference. However, by providing the informational redundancy necessary to avoid the phase ambiguity problem, these methods may also reduce the achievable data throughput of the channel. An alternative approach has been to use a coherent detection scheme.

3) Coherent Detection and Phase Noise

In pilot-assisted coherent detection, the base phase state is derived from a pilot signal, a signal of known form which is transmitted along with the data signal to provide a phase and magnitude reference. One method of transmitting pilot and data channels over the same carrier is to cover the channels with different orthogonal codes (e.g., with different Walsh functions). At the receiver, the pilot channel may be used to establish carrier synchronization and enable coherent detection by, for example, using a phase-locked loop to keep the output of a local oscillator at a constant phase angle with respect to the received pilot.

Unfortunately, carrier synchronization is often complicated by the presence of phase noise. Phase noise may have two components, one being random and the other being more determinable. The random component is primarily due to Doppler effects caused by relative motion between the transmitter and receiver (or apparent motion between the two, as might be caused by a reflector). The maximum magnitude $f_{d\_max}$ of such a Doppler shift is defined as $$f_{d\_max} = f_c \times v/c,$$

where $f_c$ is the carrier frequency in Hz, v is the relative velocity in m/sec, and c is the speed of light. For carrier frequencies in the gigahertz range and relative velocities of a few hundred miles per hour, the Doppler component may be on the order of hundreds of Hertz.

Because the Doppler component changes rapidly and may exceed a few percent of the data rate, it is typically very difficult to track using a phase-locked loop. An alternative way to compensate for this random component is to use the known pilot signal to obtain an estimate of the channel's effects. This estimate is usually in the form of a complex vector which represents the rotation in phase introduced by the channel and is used to compensate for the same rotation in the data samples.

Phase noise also arises as a frequency offset within the system architecture, caused primarily by a difference in frequency between the oscillators in the transmitter and the receiver. This difference may arise, for example, because of variances in manufacture or drift due to aging or temperature, and the effect of this offset is to introduce a phase rotation into the samples which remains relatively constant with respect to time. Section 10.1.1.3 of the IS-98A standard (TIA/EIA, July 1996) allows the frequency of the mobile station's carrier to have an error of as much as 300 Hz once the oscillators have been phase-locked.

If the constant-rotating-component frequency offset is compensated separately, then a much better estimate of the random component of the phase noise may be obtained. One method of correcting the frequency offset is by using a digital frequency-locked loop (DFLL). The elements and principles of operation of digital frequency-locked loops are well known in the art and are described, for example, in "Convergence and Output MSE of Digital Frequency-Locked Loop for Wireless Communications" by the inventor Ling, *Proceedings of the* 1996 *IEEE Vehicular Technology Conference,* Atlanta, pp. 1215–1219, and "AFC Tracking Algorithms" by Francis D. Natali, *IEEE Transactions on Communications,* vol. COM-32, no. Aug. 8, 1984, pp. 935–947, which documents are hereby incorporated by reference.

Frequency Offset Correction

FIG. 1 illustrates one method of frequency offset correction that uses a DFLL. An RF stage (not shown) supplies received analog data to conversion and correction block 110 for A/D conversion and frequency correction. As detailed below, the frequency correction operation may be performed either before or after A/D conversion. The digitized and corrected in-phase (I) and quadrature (Q) sample streams are despread by PN spreader 115 and then by data despreader 120 and pilot despreader 130 to obtain the symbols of the data and pilot channels, respectively.

Frequency discriminator 140 receives the despread pilot samples and generates an instantaneous frequency error $\hat{f}$. As illustrated in FIG. 2, the value $\hat{f}$ is calculated as the imaginary portion of the complex product of the current pilot sample and the complex conjugate of the previous pilot sample. In loop filter 150, the instantaneous frequency error $\hat{f}$ is scaled to control the convergence and bandwidth of the DFLL and then integrated to obtain a more accurate offset frequency estimate $\tilde{f}$. This estimate of offset frequency is input to block 110 and used to adjust the phase of the received data.

In block 110, frequency correction may be applied in the analog domain by inputting analog data at RF or IF and using a voltage-controlled oscillator (VCO) controlled by the DFLL to downconvert the signal to baseband before A/D conversion. While it is relatively easy to perform frequency correction on an analog signal, however, for some applications it is not practical. For example, the signal received by a CDMA base station will typically contain signals from many users, each component signal having a different frequency offset. For a TDMA base station, the signal received during each time slot will typically come from a different user and have a different frequency offset than the signal received in adjacent time slots. In such cases, it is preferable to perform the frequency correction in the digital domain. Moreover, better temperature stability and reliability of operation can be obtained in a smaller circuit area if the correction is performed digitally instead.

Frequency correction may be applied in the digital domain by inputting analog data to block 110 at baseband and applying complex rotations to the samples after A/D conversion. One disadvantage to performing the correction after digitization is that it becomes more intensive, requiring a complex rotation to be performed on every sample. For a typical chip rate of 1.2288 Mcps and a sampling rate of twice the chip rate, this method would require nearly 2.5 million complex rotations to be performed every second. The power and available area required to support such a processing rate renders digital frequency correction infeasible for many applications.

SUMMARY OF THE INVENTION

By performing frequency correction processing on the pilot channel after despreading, rather than on the received samples before despreading, the invention considerably reduces the computational effort required to compensate for a frequency offset in the data channel. In order to maintain coherence between the data and pilot channels, the invention also includes derotating the channel estimate and delaying the samples in the data channel before coherent detection is performed.

DETAILED DESCRIPTION OF THE INVENTION

Figure 3:
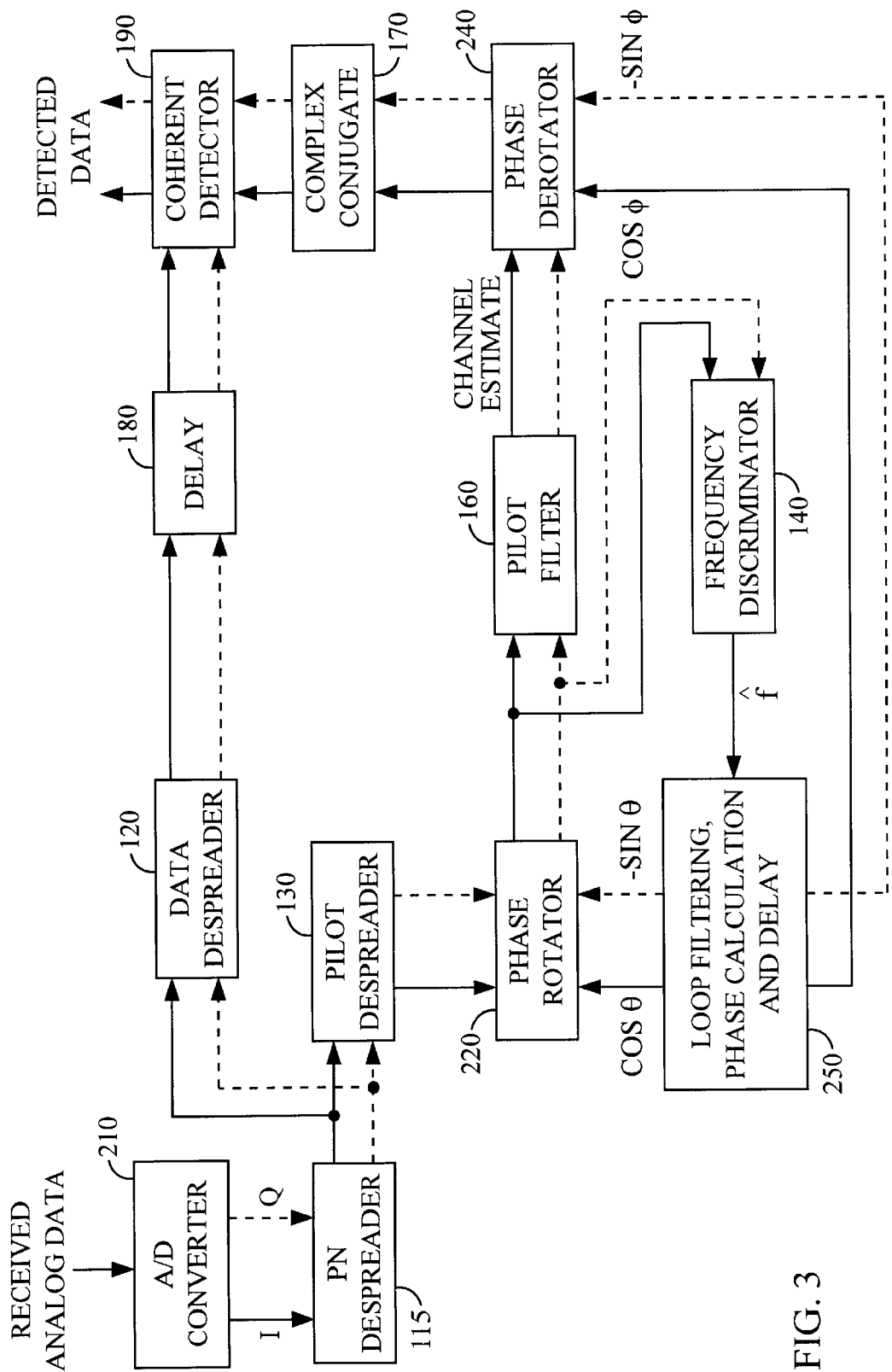
FIG. 3 is a block diagram of the first embodiment of the invention.

FIG. 3 is a block diagram of the first embodiment of the invention. In a preferred implementation, the circuit of FIG. 3 (except for loop filtering, phase calculation, and delay block 250) would be replicated for several receivers, each receiving a different multipath instance of the signal from the same or different antennas. Such single-path receivers are commonly referred to as Rake 'fingers.' In such an implementation, loop filtering, phase calculation, and delay (LFPCD) block 250 would be common to all fingers, receiving a value $\hat{f}_i$ from each finger and outputting complex pairs (cos θ, –sin θ) and (cos φ, sin φ) in common to all fingers.

Figure 5:
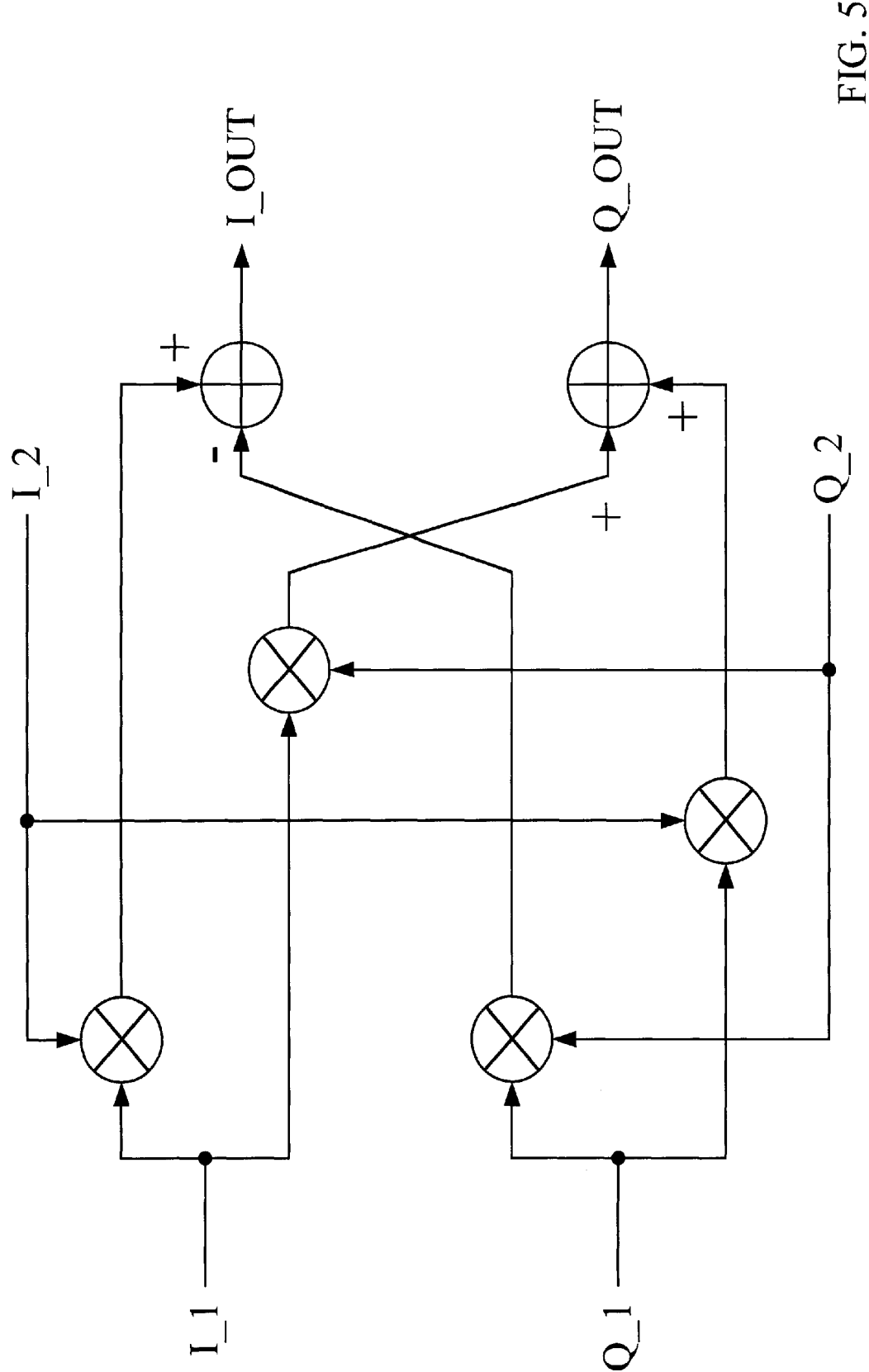
FIG. 5 shows a circuit diagram for a complex multiplier.

In the preferred embodiment of FIG. 3, the baseband analog data received from the RF and/or IF stages (not shown) passes through A/D converter 210, is despread by the PN sequence in PN despreader 115, and undergoes further despreading in data despreader 120 and pilot despreader 130. Despreaders 115 and 120 may be implemented as complex multipliers as illustrated in FIG. 5, where the inputs I_2 and Q_2 are the respective despreading codes. Assuming that the frequency offset is much lower than the data sample rate, the frequency offset may be ignored during the despreading operations.

In a preferred implementation, the pilot channel is covered by Walsh function 0 (i.e., the covering function is effectively a constant value). In this case, pilot despreader 130 may be implemented as an integrate-and-dump circuit. The integration period should be long in order to reduce the sample frequency and thus reduce the computational load, but on the other hand the integration period should be short so that the phase shift due to the frequency offset is negligible within that period. For a frequency offset of 300 Hz and a Doppler component of a few hundred Hertz, an integration period of about 200 μs is used for one embodiment. Before further processing, it may be desirable to truncate the pilot samples by right-shifting, for example. Truncation serves to reduce the data bitwidth in later stages, and a moderate amount of truncation and rounding at this stage has not been shown to introduce any performance degradation. However, truncation is optional.

After despreading, the pilot samples are rotated in phase rotator 220. A preferred implementation of phase rotator 220 is a complex multiplier, as shown in FIG. 5. The complex values which represent the angle of rotation θ are output by LFPCD block 250 as described below.

Figure 1:
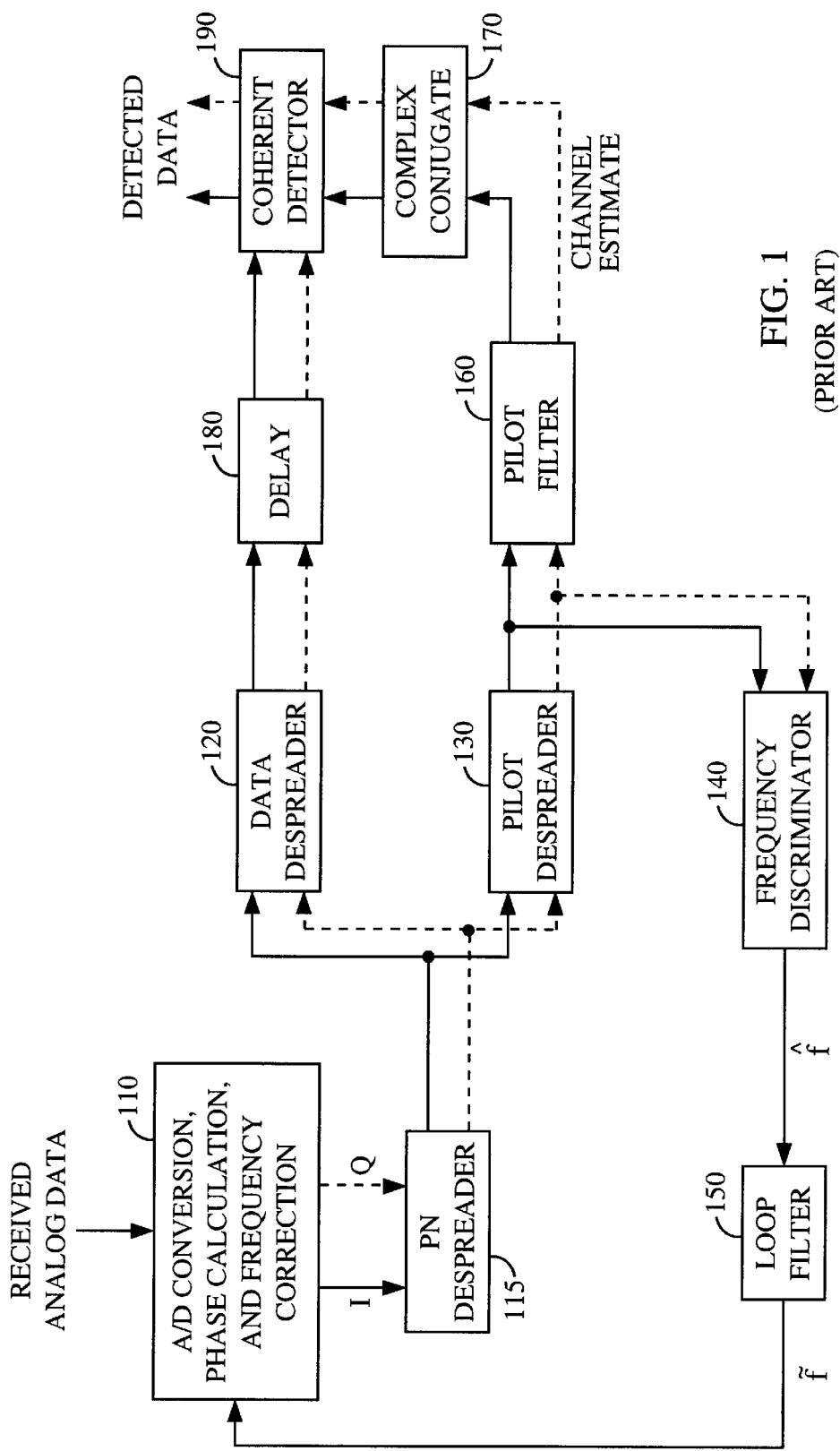
FIG. 1 illustrates a method of frequency correction.
Figure 2:
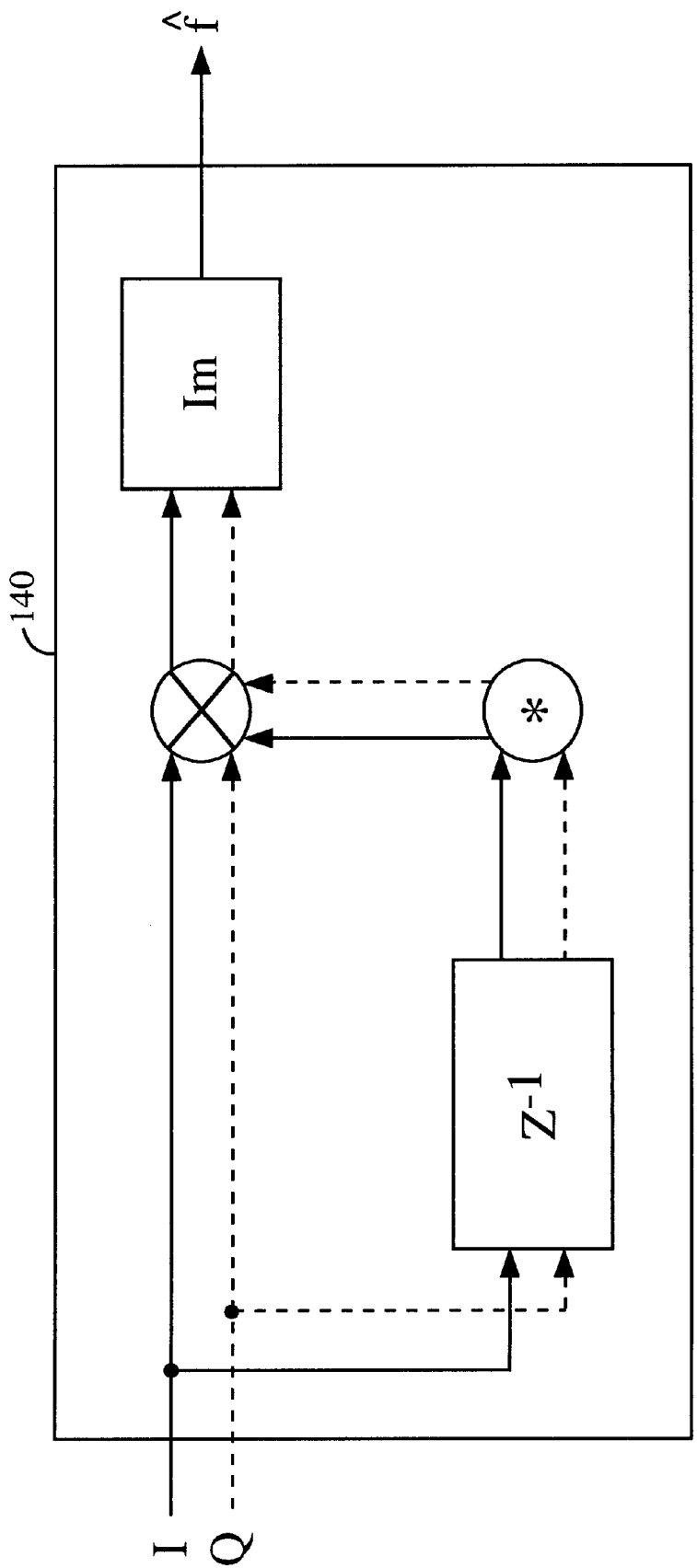
FIG. 2 shows a circuit diagram for frequency discriminator 140.
Figure 4:
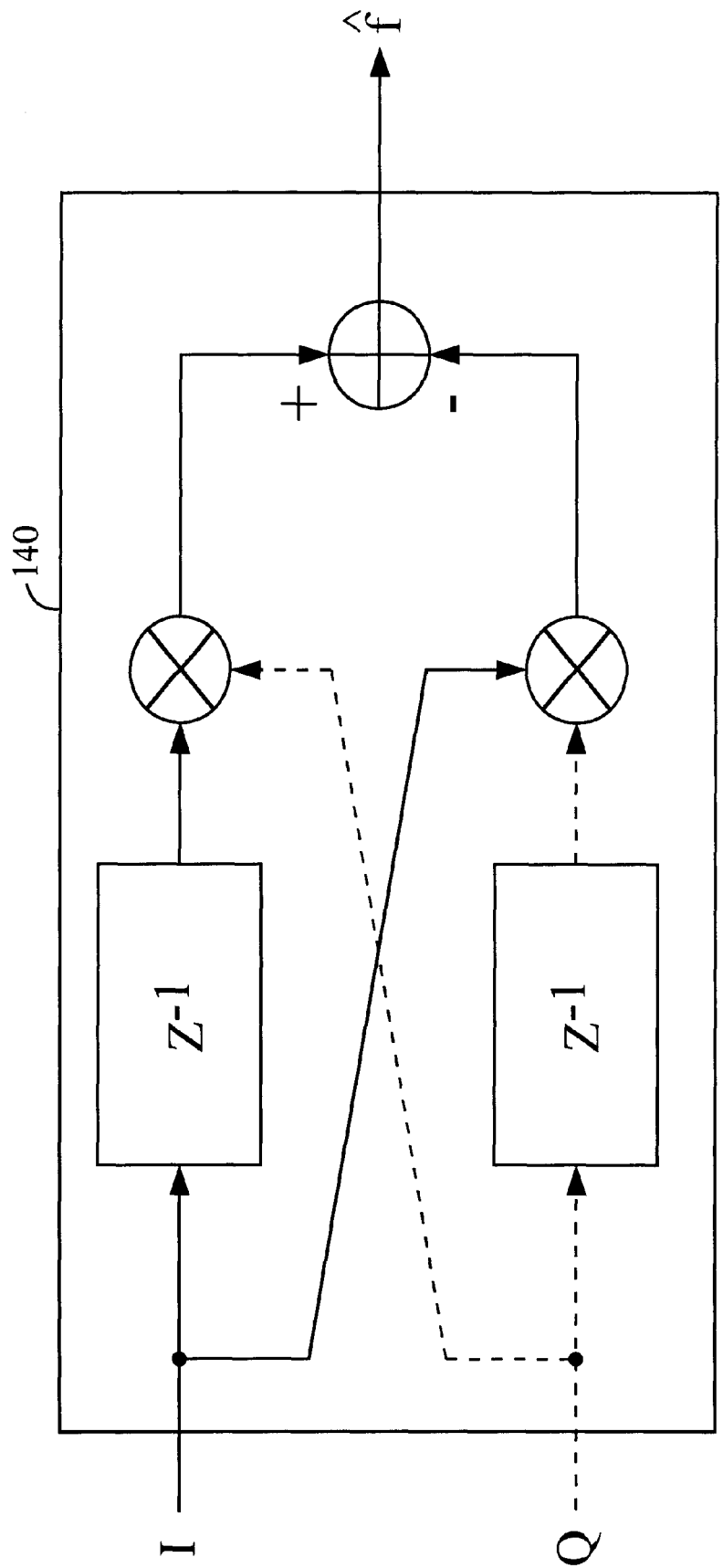
FIG. 4 shows a circuit diagram for a quadricorrelator being a preferred implementation of frequency discriminator 140.

The rotated pilot samples are input to frequency discriminator 140, which outputs a measure $\hat{f}$ of the instantaneous frequency error. In a preferred implementation, frequency discriminator 140 (whose functionality is shown in FIG. 2) is implemented as a quadricorrelator as illustrated in FIG. 4.

Figure 6:
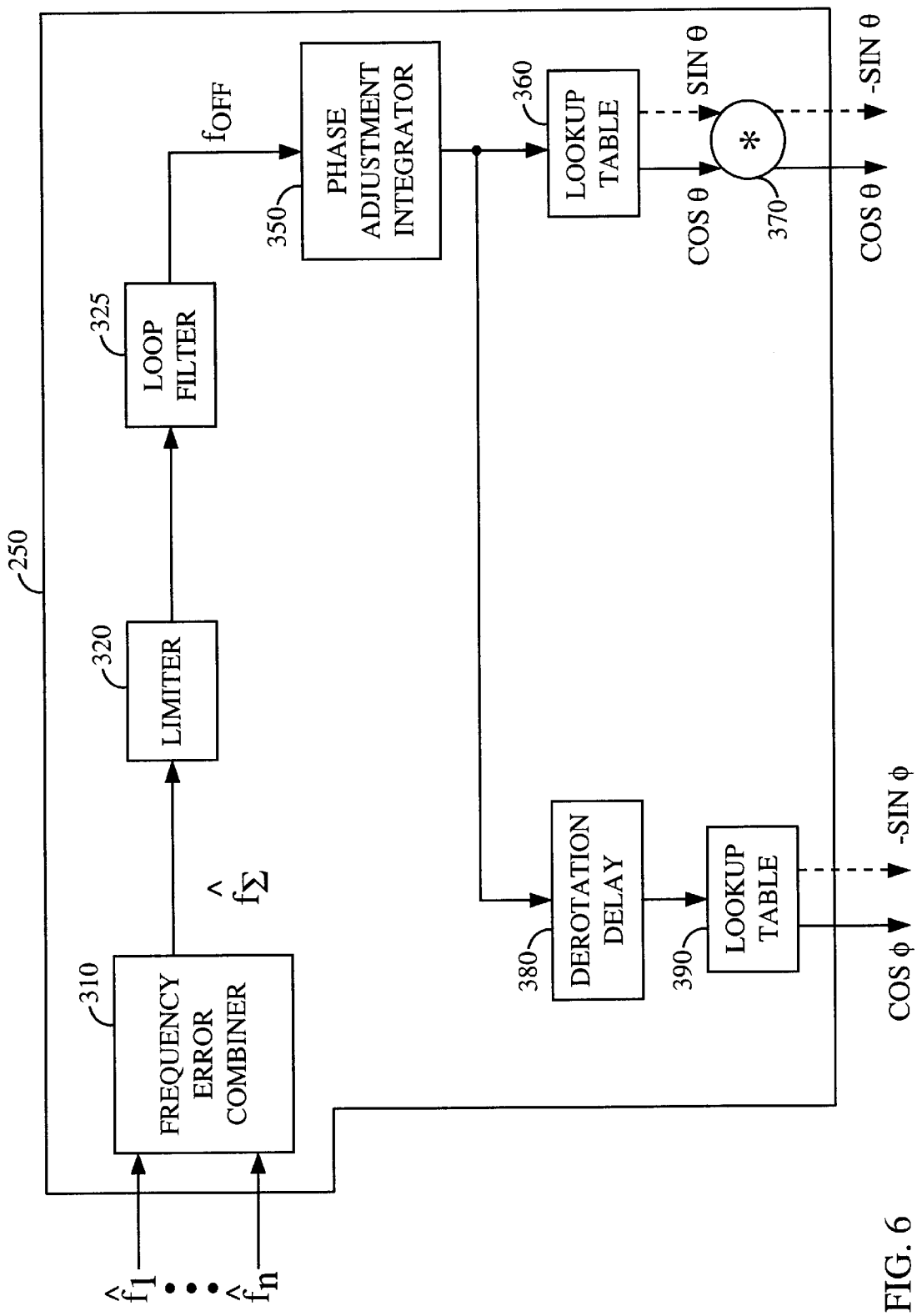
FIG. 6 illustrates a first implementation of loop filtering, phase calculation, and delay block 250.

FIG. 6 shows a block diagram of LFPCD block 250. As noted above, in a preferred implementation, a number of fingers individually calculate instantaneous frequency errors $\hat{f}_i$. These values are input to LFPCD block 250 through frequency error combiner 310. In a preferred implementation, combiner 310 outputs a value $\hat{f}_\Sigma$ as the sum of the values $\hat{f}_i$. However, combiner 310 may be constructed to output a weighted or non-weighted average of these values as well. If only one value of $\hat{f}$ is input to LFPCD block 250, combiner 310 may be omitted.

Limiter 320 provides a measure of system stability by restricting the possible range of the frequency error reported. In an alternative implementation, robustness is not necessary or is provided elsewhere. In such implementations, limiter 320 may be omitted.

Figure 10:
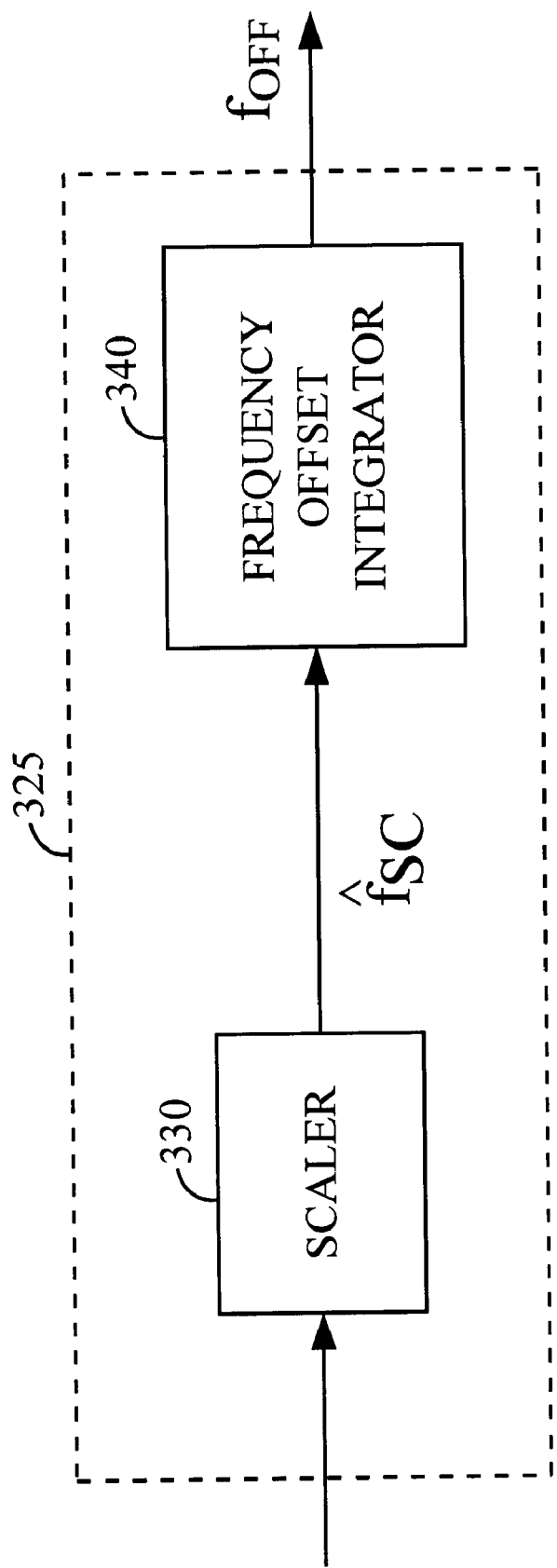
FIG. 10 illustrates a first-order implementation of loop filter 325.

Loop filter 325 receives the limited or non-limited frequency error value $\hat{f}_\Sigma$ (or $\hat{f}$, as appropriate) and outputs a frequency offset value $f_{off}$. FIG. 10 shows one implementation of a first-order filter suitable for use as loop filter 325. In this implementation, scaler 330 receives the input signal and outputs a scaled error value $\hat{f}_{sc}$. It is preferable to avoid multiplication in this stage by choosing a scaling factor of $2^{-n}$ and implementing scaler 330 as a right-shifter. As noted in the references incorporated above, for a first-order DFLL, the scaling factor determines the time constant of the DFLL (or, equivalently, its loop bandwidth) according to the following expression:

$$T_c = NT_s/(\alpha k_d k_0),$$

where $T_c$ is the time constant of the DFLL in seconds; N is the insertion delay of the frequency discriminator and update interval of the loop filter in samples; $T_s$ is the sample period in seconds; α is the nondimensional scaling factor; $k_d$ is the gain of the frequency discriminator in LSB/Hz, where LSB denotes the least significant bit of the output of the frequency discriminator; and $k_0$ is the resolution of the phase rotation operation in Hz/LSB, where LSB denotes the least significant bit of the input to the digital-to-frequency converter (here, the input to lookup table 360). In a typical application, the scaling factor is the only factor in this expression that can be changed dynamically. (Parameters that may affect the values of the other factors in the expression above include the integration period, the signal-to-noise ratio, and the particular implementation of the digital-to-frequency converter.)

Of course, the scaling factor must also be chosen with regard to the number of fingers input to frequency error combiner 310 and the nature of combination performed therein (e.g. whether the inputs are averaged or simply accumulated). In order to keep the frequency error at the DFLL output below a desirable value, e.g., 100 Hz and ensure that this error will not degrade receiver performance, it is desirable for the time constant to be within the range from approximately 10 to approximately a few hundred milliseconds. In the exemplary application, typical values for the scaling factor range from approximately $2^2$ (4) to approximately $2^{-4}$ (1/16).

Figure 7:
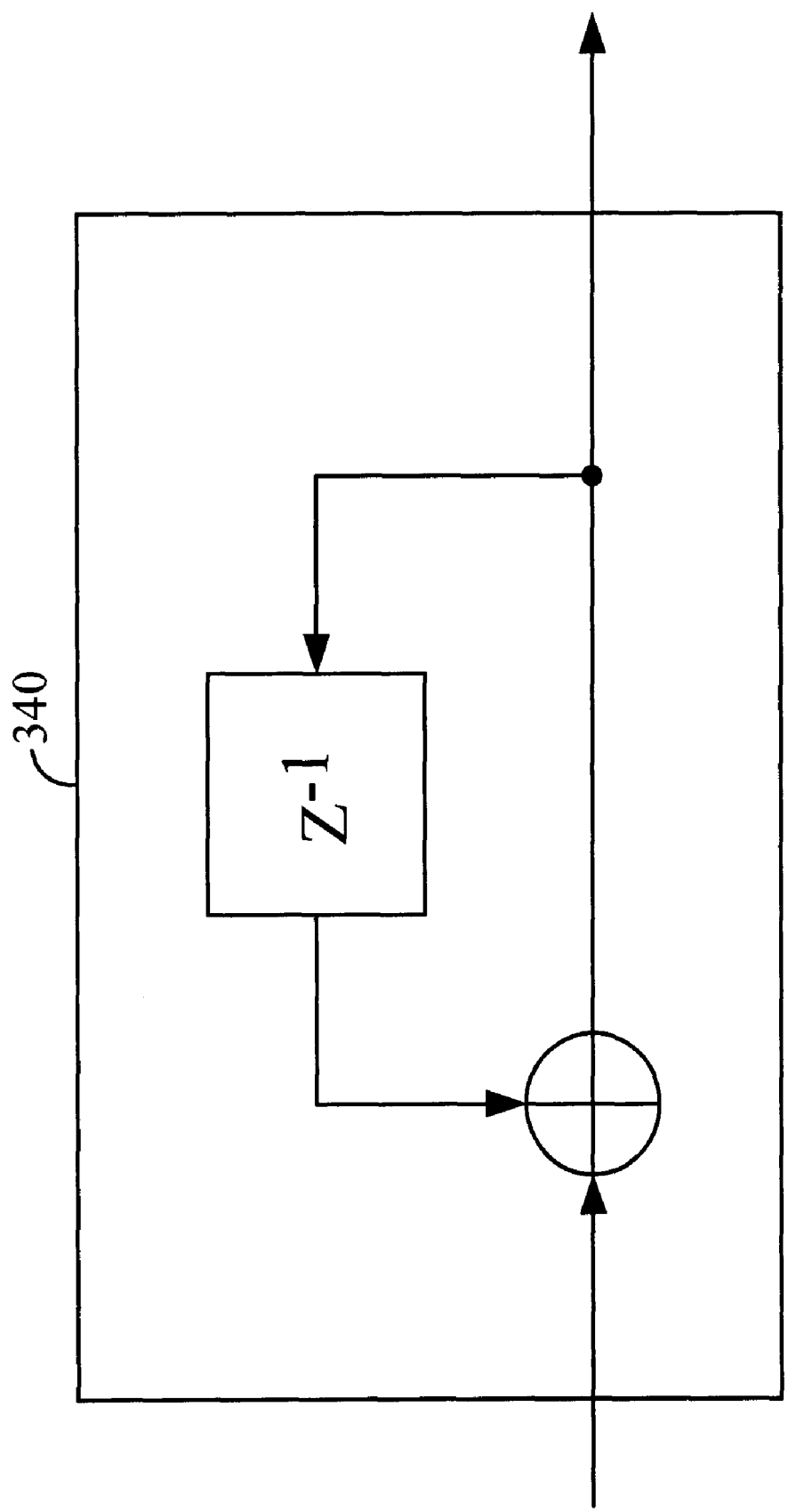
FIG. 7 illustrates an implementation of frequency offset integrator 340.

Frequency offset integrator 340 receives the scaled frequency error value $\hat{f}_{sc}$ and outputs a frequency offset value $f_{off}$ that characterizes the difference in frequency between the oscillators of the transmitter and receiver. In a preferred implementation, frequency offset integrator 340 is constructed as a perfect integrator as shown in FIG. 7. Assuming that the frequencies of the transmitter and receiver oscillators are perfectly constant and that the random component of the phase noise does not affect the DFLL, then one can see that the value of $\hat{f}_{sc}$ will approach zero and that the value of $f_{off}$ will approach a constant. The range of possible values for $f_{off}$ represents the range of frequency offsets that may be compensated by this circuit.

Figure 11:
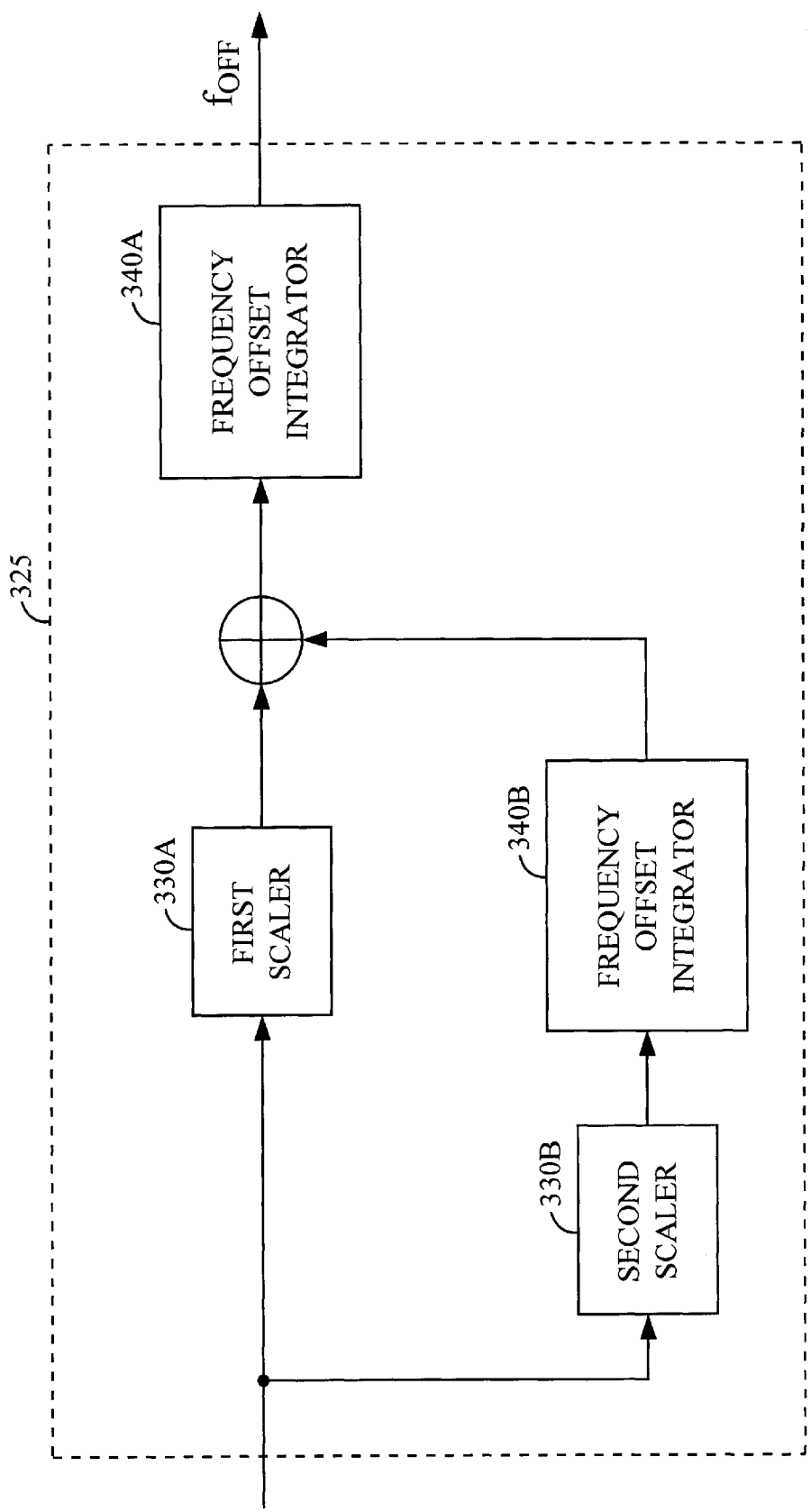
FIG. 11 illustrates a second-order implementation of loop filter 325.

One of ordinary skill in the art will recognize that loop filters of higher order, such as the second-order configuration shown in FIG. 11, may be used instead of a first-order configuration for loop filter 325 if, for example, a different convergence characteristic is desired. In these alternative implementations of the invention, the structures of frequency offset integrators 340a and 340b will typically be the same as shown in FIG. 7 for integrator 340, and first scaler 330a and second scaler 330b may each have the same constant value or may have different constant values.

Figure 8A:
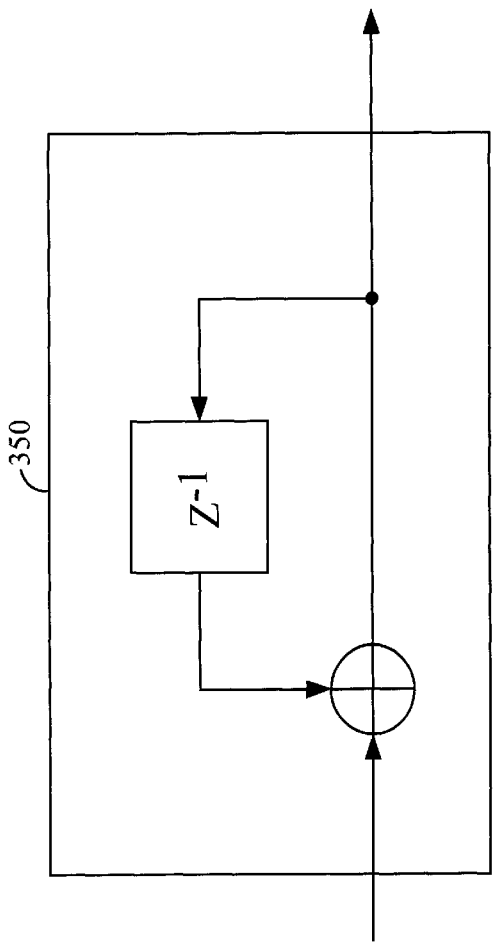
FIG. 8A illustrates an implementation of phase adjustment integrator 350.
Figure 8B:
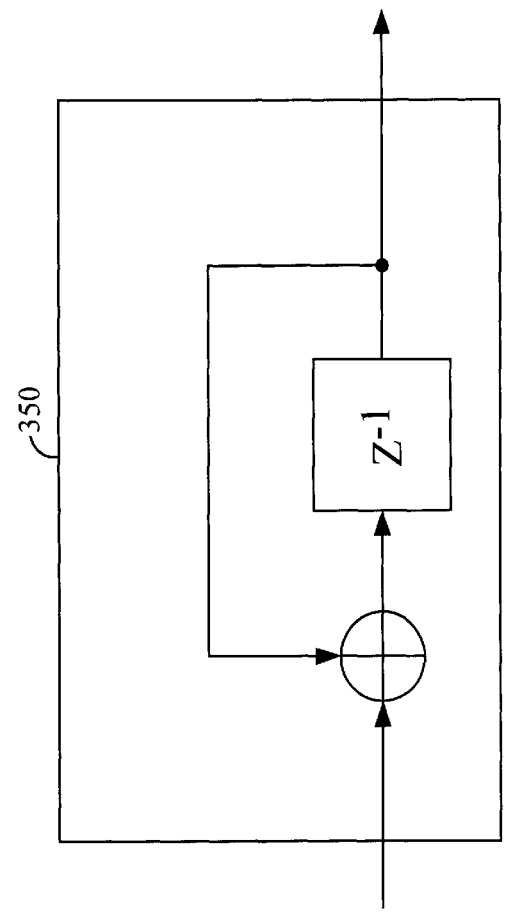
FIG. 8B illustrates a second implementation of phase adjustment integrator 350.

Phase adjustment integrator 350 serves to convert the frequency offset $f_{off}$ into a phase adjustment factor $\theta$. In a preferred implementation, phase adjustment integrator 350 has either the structure shown in FIG. 8A or the one shown in FIG. 8B; the maximum and minimum values of output value $\theta$ substantially correspond to $\pi$ and $-\pi$, respectively; and overflow is ignored such that phase adjustment integrator 350 performs modulo $2\pi$ accumulation.

Lookup table 360 is preprogrammed to convert the phase value $\theta$ into a pair of values representing a complex phase vector (for example, $\cos \theta$ and $\sin \theta$). After passing through complex conjugator 370, this complex vector is input to phase rotator 220, where the pilot sample is rotated according to the following expression:

$$r_p e^{j(p-\theta)} = r_p e^{jp} e^{-j\theta} = r_p(\cos p + j \sin p)(\cos \theta - j \sin \theta),$$

where $r_p$ is the magnitude of the pilot sample, p is the angle of the pilot sample as received, and p–$\theta$ is the angle of the pilot sample after correction of the frequency offset.

The rotated pilot samples are also input to pilot filter 160, which produces an estimate of the channel. The channel estimate represents the distortions of phase rotation and magnitude scaling introduced into the pilot signal by the channel and is typically reported as a vector in I/Q space. The number of taps N in filter 160 is chosen to provide the best overall channel estimate. On one hand, it is desirable that the channel remains relatively constant over the life span of the estimate, so that N should remain small. On the other hand, an estimate of higher accuracy may be obtained with a larger N. Filter 160 may be implemented as either an IIR or a FIR filter. In a preferred embodiment, filter 160 is an complex eight-tap rectangular averager.

Figure 9:
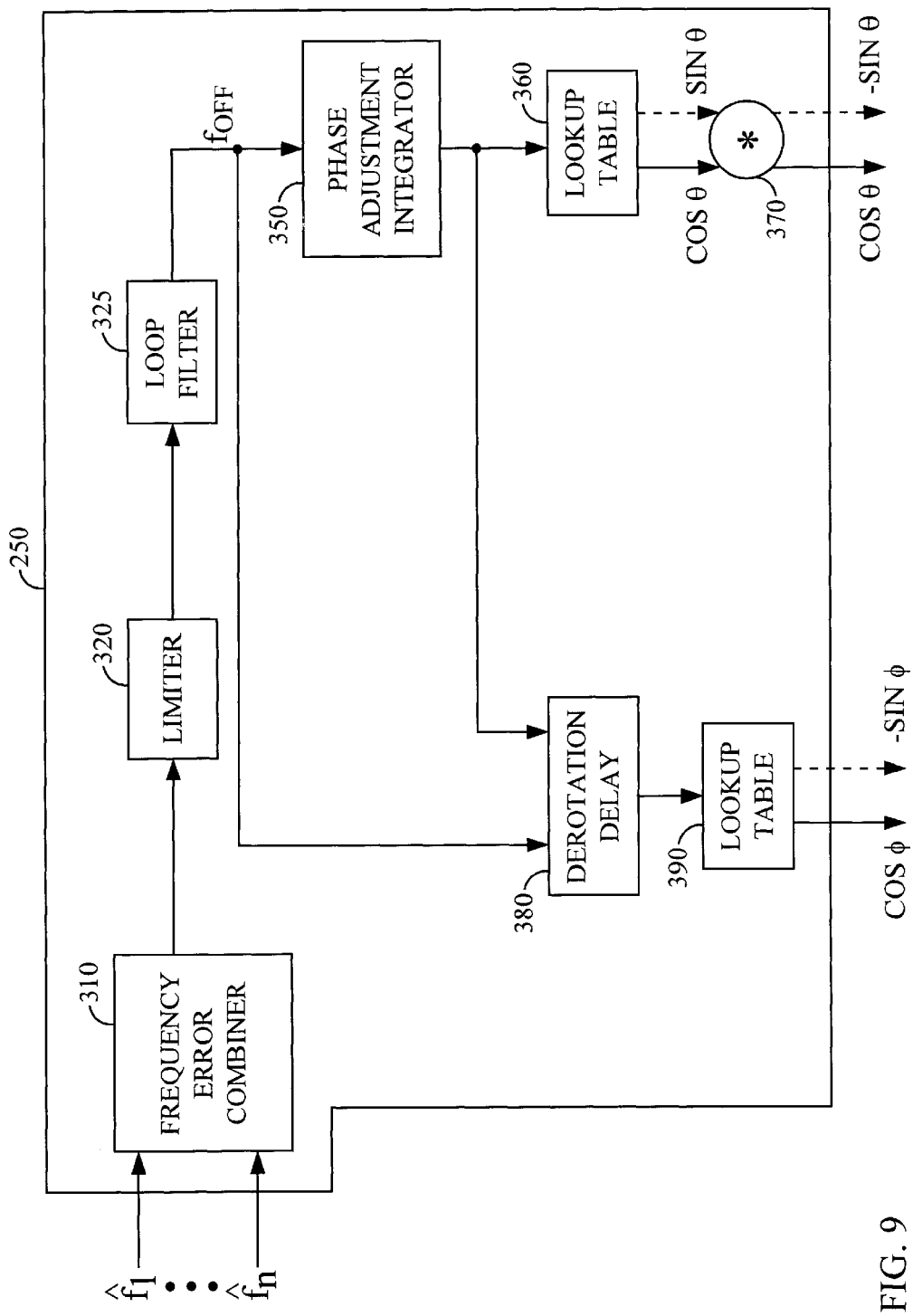
FIG. 9 illustrates a second implementation of loop filtering, phase calculation, and delay block 250.

Because the channel estimate is constructed from rotated pilot samples, its phase does not coincide with the phase of the samples in the data channel to be demodulated. Therefore, it is necessary to remove the rotation that was introduced by phase rotator 220 before this estimate may be applied to the data channel. Toward this end, the phase rotation factors that were supplied to phase rotator 220 by phase calculation block 250 are delayed by derotation delay 380 such that they reach phase derotator 240 at substantially the same time as the corresponding channel estimate is produced by pilot filter 160. As shown in FIG. 6, derotation delay 380 may receive the values $\theta$ from phase adjustment integrator 350. In a preferred implementation, however, as shown in FIG. 9, derotation delay 380 receives $\theta$ and also $f_{off}$, and a split-sample delay time is effectively obtained by combining these two values in an appropriate proportion.

Lookup table 390 is preprogrammed to convert the delayed phase value $\phi$ into a pair of values representing a complex phase vector (for example, $\cos \phi$ and $\sin \phi$). In a preferred implementation, lookup tables 360 and 390 are the same unit, and the addressing input to this table is multiplexed between phase adjustment integrator 350 and derotation delay 380. Note that if lookup tables 360 and 390 are not the same unit, then lookup table 360 may be modified to hold complex conjugate values instead, thereby dispensing with the need for complex conjugator 370.

The complex vector is input to phase derotator 240. As with phase rotator 220, the preferred implementation of phase derotator 240 is a complex multiplier as shown in FIG. 5. Because the phase adjustment vector is not complex conjugated in this stage, the rotation introduced by phase rotator 220 is removed from the channel estimate according to the following expression:

$$e^{j(p-\theta+\phi)} = e^{j(p-\theta)} e^{j\phi} = [(\cos p + j \sin p)(\cos \theta - j \sin \theta)](\cos \phi + j \sin \phi),$$

where p–$\theta$ is the angle of the channel estimate, and p–$\theta$+$\phi$ is the angle of the channel estimate after restoration of the frequency offset. In a preferred implementation, the derotation angle $\phi$ has the same value as the rotation angle $\theta$, so that the value of p–$\theta$+$\phi$ is simply p, the angle of the pilot sample as received. However, it is also possible to refine the value of $\phi$ on the basis of information that was not available when the value of $\theta$ was calculated.

After derotation, the channel estimate passes through complex conjugator 170 and is combined with the despread and delayed data samples in coherent detector 190. As with phase rotator 220 and derotator 240, the preferred implementation of coherent detector 190 is a complex multiplier as shown in FIG. 5.

Figure 12:
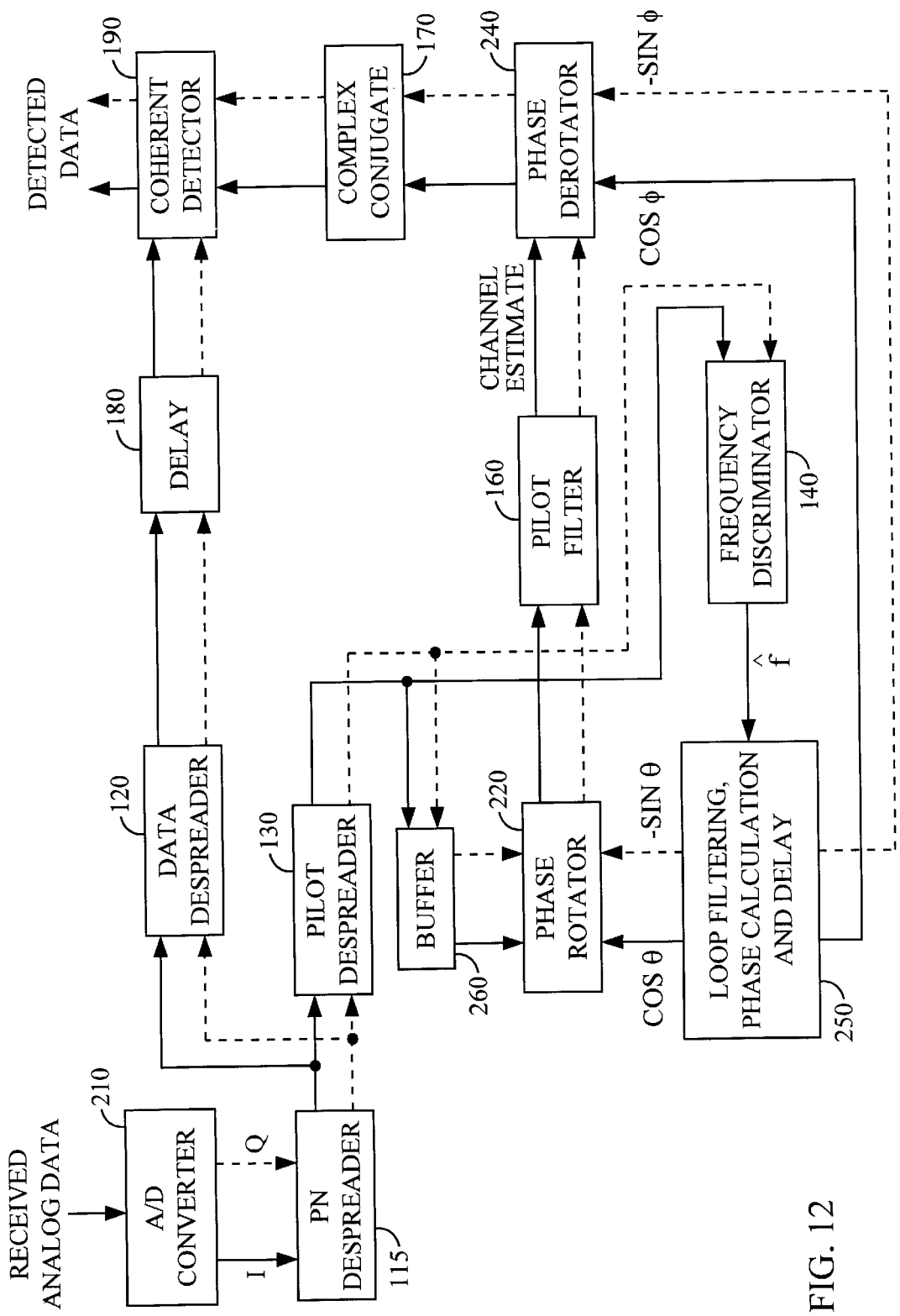
FIG. 12 is a block diagram of an alternative embodiment of the invention.

In the preferred embodiments described and illustrated above, the phase rotation $\theta$ is calculated from a first set of pilot samples, taken at a first point in time from the stream of samples output by PN despreader 115. In phase rotator 220, the phase rotation $\theta$ is then applied to a second set of pilot samples, taken from the same stream of samples output by PN despreader 115 but at a later point in time than the first set. In an alternative embodiment, as shown in FIG. 12, the phase rotation $\theta$ calculated from a set of pilot samples is applied in phase rotator 220 back to the same set of pilot samples by, for example, keeping a copy of each set of pilot samples in a buffer 260.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. For example, even though the preferred embodiment relates to a CDMA receiver with a code-division-multiplexed pilot, the invention may also be applied to a receiver with a time-division-multiplexed pilot or to a TDMA receiver. Additionally, one of ordinary skill in the art will recognize that although the preferred embodiment of the invention processes signals that have been digitized, the novel principles described herein are equally applicable to a system that processes analog signals or to a hybrid system. Thus, the present invention is not intended to be limited to the embodiments shown above, but rather is to be accorded the widest scope consistent with the principles and novel features disclosed in any fashion herein.

We claim:

1. An apparatus for frequency offset correction, comprising:
   a phase rotator receiving a pilot and a first phase adjustment value and outputting a rotated pilot, the pilot having a frequency offset and a phase rotation;
   a frequency discriminator receiving the rotated pilot and outputting a frequency error value;

a phase calculation and delay unit receiving the frequency error value and outputting the first phase adjustment value and a second phase adjustment value;

a pilot filter receiving the rotated pilot and outputting a channel estimate; and a phase derotator receiving the channel estimate and the second phase adjustment value and outputting a derotated channel estimate, wherein the first and second phase adjustment values are complex values, and wherein the second phase adjustment value is substantially a delayed version of the first phase adjustment value, and wherein the rotated pilot is substantially the pilot without the frequency offset, and wherein the channel estimate is substantially a complex value representing the phase rotation.

2. An apparatus according to claim 1, said frequency discriminator comprising a quadricorrelator.

3. An apparatus according to claim 1, said phase calculation and delay unit comprising:

a first integrator receiving a signal based on the frequency error value and outputting a frequency offset value; and a second integrator receiving the frequency offset value and outputting a phase correction value;

wherein the first phase adjustment value and the second phase adjustment value are based on the phase correction value.

4. An apparatus for frequency offset correction, comprising:

a pilot despreader receiving a plurality of received pilot samples and outputting a plurality of despread pilot samples, said plurality of despread pilot samples having a frequency offset and a phase rotation;

a buffer receiving the plurality of despread pilot samples and outputting a plurality of delayed despread pilot samples;

a phase rotator receiving the plurality of delayed despread pilot samples and a first phase adjustment value and outputting a plurality of rotated pilot samples;

a frequency discriminator receiving the plurality of despread pilot samples and outputting a frequency error value;

a phase calculation and delay unit receiving the frequency error value and outputting the first phase adjustment value and a second phase adjustment value;

a pilot filter receiving the plurality of rotated pilot samples and outputting a channel estimate; and a phase derotator receiving the channel estimate and the second phase adjustment value and outputting a derotated channel estimate, wherein the first and second phase adjustment values are complex values, and wherein the second phase adjustment value is substantially a delayed version of the first phase adjustment value, and wherein the plurality of rotated pilot samples are substantially the plurality of despread pilot samples without the frequency offset, and wherein the channel estimate is substantially a complex value representing the phase rotation.

5. A method for frequency offset correction, comprising:

receiving a pilot and a first phase adjustment value and outputting a rotated pilot, the pilot having a frequency offset and a phase rotation;

receiving the rotated pilot and outputting a frequency error value;

receiving the frequency error value and outputting the first phase adjustment value and a second phase adjustment value;

receiving the rotated pilot and outputting a channel estimate; and receiving the channel estimate and the second phase adjustment value and outputting a derotated channel estimate, wherein the first and second phase adjustment values are complex values, and wherein the second phase adjustment value is substantially a delayed version of the first phase adjustment value, and wherein the rotated pilot is substantially the pilot without the frequency offset, and wherein the channel estimate is substantially a complex value representing the phase rotation.

6. A method according to claim 5, further comprising:

receiving a signal based on the frequency error value and outputting a frequency offset value; and receiving the frequency offset value and outputting a phase correction value;

wherein the first phase adjustment value and the second phase adjustment value are based on the phase correction value.

7. A computer readable medium embodying a method for frequency offset correction, the method comprising:

receiving a pilot and a first phase adjustment value and outputting a rotated pilot, the pilot having a frequency offset and a phase rotation;

receiving the rotated pilot and outputting a frequency error value;

receiving the frequency error value and outputting the first phase adjustment value and a second phase adjustment value;

receiving the rotated pilot and outputting a channel estimate; and receiving the channel estimate and the second phase adjustment value and outputting a derotated channel estimate, wherein the first and second phase adjustment values are complex values, and wherein the second phase adjustment value is substantially a delayed version of the first phase adjustment value, and wherein the rotated pilot is substantially the pilot without the frequency offset, and wherein the channel estimate is substantially a complex value representing the phase rotation.

8. A computer readable medium according to claim 7, the method further comprising:

receiving a signal based on the frequency error value and outputting a frequency offset value; and receiving the frequency offset value and outputting a phase correction value;

wherein the first phase adjustment value and the second phase adjustment value are based on the phase correction value.

9. An apparatus for frequency offset correction, comprising:

means for receiving a pilot and a first phase adjustment value and outputting a rotated pilot, the pilot having a frequency offset and a phase rotation;

means for receiving the rotated pilot and outputting a frequency error value;

means for receiving the frequency error value and outputting the first phase adjustment value and a second phase adjustment value;

means for receiving the rotated pilot and outputting a channel estimate; and means for receiving the channel estimate and the second phase adjustment value and outputting a derotated channel estimate, wherein the first and second phase adjustment values are complex values, and wherein the second phase adjustment value is substantially a delayed version of the first phase adjustment value, and wherein the rotated pilot is substantially the pilot without the frequency offset, and wherein the channel estimate is substantially a complex value representing the phase rotation.

10. An apparatus according to claim 9, wherein said means for receiving the rotated pilot and outputting a frequency error value comprises a quadricorrelator.

11. An apparatus according to claim 9, further comprising:

means for receiving a signal based on the frequency error value and outputting a frequency offset value; and means for receiving the frequency offset value and outputting a phase correction value;

wherein the first phase adjustment value and the second phase adjustment value are based on the phase correction value.

* * * * *